Jan. 1, 1963  A. A. MARR  3,070,815
SHOT SPLITTING AND APPLYING DEVICE FOR FISHERMEN
Filed Aug. 4, 1961  2 Sheets-Sheet 1

INVENTOR.
AIDREN A. MARR
BY
ATTORNEY

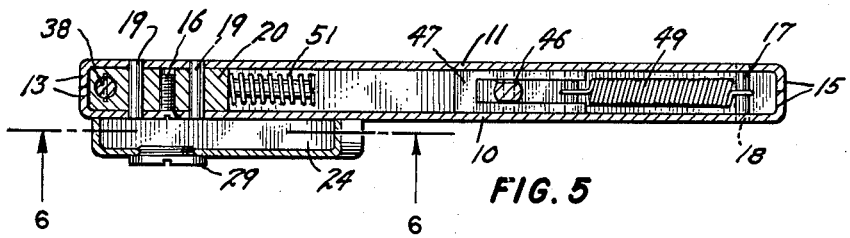
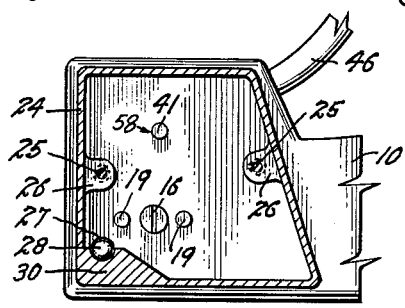
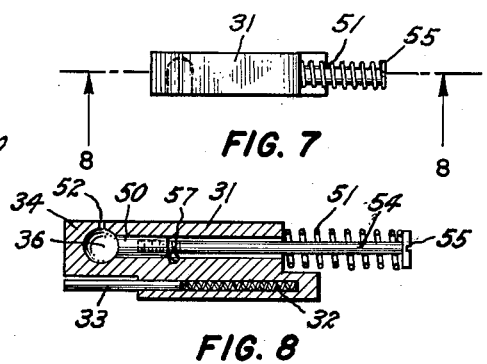
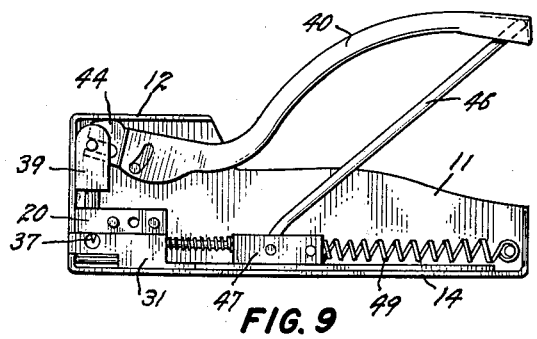
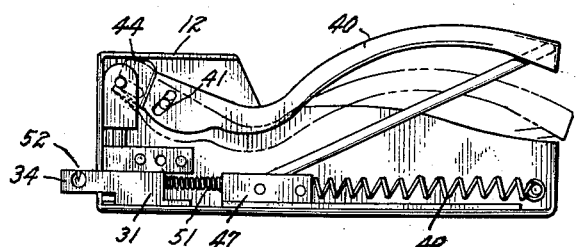

United States Patent Office 3,070,815
Patented Jan. 1, 1963

3,070,815
SHOT SPLITTING AND APPLYING DEVICE FOR FISHERMEN
Aidren A. Marr, Henderson, Colo.
(407 SW. 3rd, Abilene, Kans.)
Filed Aug. 4, 1961, Ser. No. 129,324
11 Claims. (Cl. 7—5.4)

Lead shot are used by fishermen for weighting a fishing line to facilitate casting of the line and as sinkers for causing the line to sink below the surface of a lake or stream.

Occasionally ordinary BB shot are manually notched or partially split, the line is placed in the split and the latter is closed on the line with the teeth or any convenient tooth. Pre-split is also available for fishermen's use. However, it is often exceedingly difficult to place the shot on the line and to hold it in place, under adverse out door conditions, until it can be closed or clamped to the line.

The principal object of this invention is to incorporate in a single convenient tool means for storing conventional lead shot, means for splitting the shot, means for holding a split shot in the proper position for receiving a fishing line or leader, and means for closing the split securely upon the line and to so construct the tool that all of the above functions can be quickly and easily carried out with one hand leaving the other hand free for supporting a fishing rod.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 5 is a longitudinal section looking downwardly on the line 5—5, FIG. 3;

FIG. 6 is a fragmentary vertical section taken on the line 6—6, FIG. 5;

FIG. 7 is a detail top view of an anvil block employed in the tool;

FIG. 8 is a longitudinal section through the anvil block, taken on the line 8—8, FIG. 7; and FIGS. 9 and 10 are reduced scale views showing various positions of the operating mechanism.

Figures 1, 2:
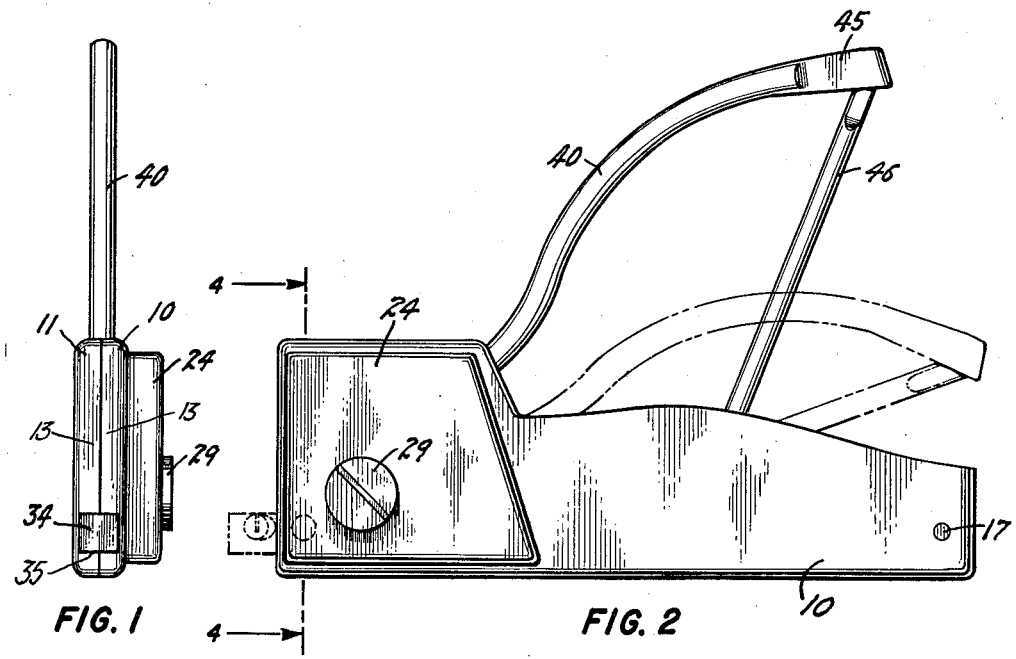
FIG. 1 is a front end view of the improved shot splitting and applying tool.
FIG. 2 is a side elevational view thereof.

The improved shot splitting and applying tool is of what might be termed the "plier type" arranged to be held in the palm of one hand and operated by simply contracting the hand similarly to operating a pair of conventional pliers.

The tool comprises a left cover plate 10 and a right cover plate 11. The two cover plates are similar but of opposite hand, each having a top flange 12, a front flange 13, a bottom flange 14 and a rear flange 15. The cover plates are secured together with their flanges in contact by means of a cap screw 16. The plates are maintained in alignment by means of a rear dowel pin 17, affixed in and projecting from the right cover plate 11 into a pin hole 18 in the left cover plate 10, and two forward dowel pins 19 which project into receiving openings in the left plate 10 at each side of the cap screw 16. When the two plates are secured together, they form a flat hollow housing of a width equal to twice the height of the flanges. The housing is closed at its rear, its bottom, its front and the fore part of its top. The remainder of the top is open.

The forward dowel pins 19 project from an elongated spacer block 20 affixed in the front of the right cover plate parallel to the bottom flange 14. The spacer block is provided with a threaded screw hole 21 for receiving the cap screw 16. An elongated slide track bar 22 is fixedly mounted in the bottom of the right cover plate 11 in any suitable manner such as by means of rivets 23. The track plate is equal in width to the full width of the housing and terminates short of the forward extremity of the latter.

A flat shot reservoir 24 is mounted against the side of the left cover plate 10 adjacent the front thereof in any suitable manner such as by means of attachment screws extending outwardly through the left cover plate and threaded into screw-receiving pads 26 on the interior of the shot reservoir 24. The left cover plate has a feed opening 27, through which shot, shown at 28, feed from the reservoir into the housing. The reservoir 24 is provided with a filling opening closed by a removable threaded cap 29 which, when in place, conceals the cap screw 16. A raised, notched shot rest 30 is formed in the bottom of the reservoir 24 to support a shot in alignment with the feed opening 27. The bottom of the notch in the shot rest is preferably inclined toward the housing so that a shot 28 resting therein will naturally gravitate through the opening 27.

The operating mechanism comprises a reciprocating anvil block 31 positioned on the bottom flange 14 forwardly of the slide track bar 22 and below the spacer block 20. The anvil block 31 is constantly urged rearwardly into contact with the forward extremity of the track bar 22 by means of an internal compression spring 32 which acts to force a spring pin 33 against the front flange 13 of the right cover plate.

The anvil block is formed with a rectangular shot holding extremity 34 which can be projected through a rectangular front opening 35 in the two front flanges 13. The shot holding extremity 34 contains a shot socket 36 which, when the anvil block is retracted against the track bar 22, is aligned with the feed opening 27 to receive a shot therefrom.

The anvil block is drilled longitudinally to slidably receive a shot-closing plunger 50 which can enter the side of the shot socket 36 to compress the split of a split shot contained in the socket 36 closed on a fish line. A relatively long plunger screw 54 is threaded into the rear of the plunger 50 and projects rearwardly of the anvil block terminating in a head 55. A plunger spring 51 surrounds the plunger screw 54 between the anvil block and the head 55 to constantly urge the plunger rearward to a withdrawn position. The withdrawal movement of the plunger is limited by means of a stop pin 56 inserted transversally of the anvil block in the path of the plunger 50 as shown more in detail in FIG. 8.

Figures 3, 4:
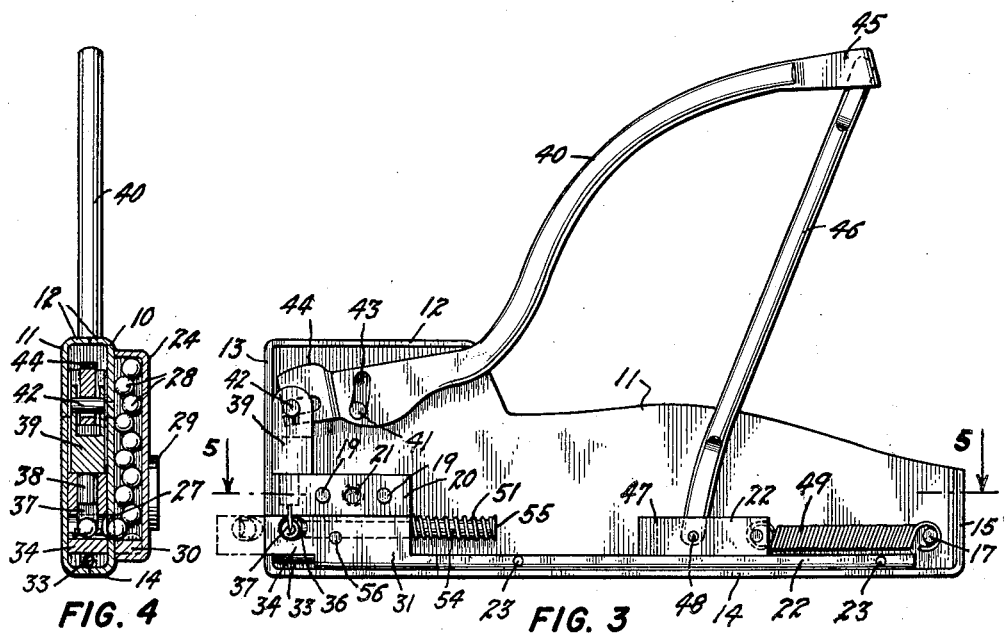
FIG. 3 is a side view of the internal mechanism of the tool as it would appear with the near side-cover-plate removed.
FIG. 4 is a cross section taken on the line 4—4, FIG. 2.

A shot resting in the shot socket 36 is split by means of a splitting knife blade 37 which descends through a transverse slot 52 in the top of the shot socket. The knife blade is mounted in and projects downwardly from the lower extremity of a plunger pin 38 which is vertically slidable in the spacer block 20. The plunger pin 38 is mounted in or formed on a head block 39 which comes to rest on top of the spacer block 20 to limit the downward descent of the knife blade 37 to a point slightly above the bottom of the shot socket 36 as shown in FIG. 4.

The knife blade is forced downwardly into a shot in the socket 36 to split a shot contained therein in consequence of the upward movement of a hand lever 40. The hand lever is shiftably pivoted on a pivot pin 41 extending from the right cover plate 11 into a receiving opening 53 in the left cover plate 10. The upper extremity of the head block 39 is bifurcated and a wrist pin 42 extends across the bifurcation. The forward extremity of the hand lever is slotted to receive the wrist pin 42. The hand lever is provided with an arcuately elongated pivot slot 43 for receiving the pivot pin 41 and with a fulcrum boss 44 on top of its forward extremity which contacts the top flanges 12 of the housing when the rear of the hand lever 40 is swung downwardly, as will be later described.

The rear extremity of the hand lever 40 is provided with a downwardly-opening hood 45 for receiving the upper extremity of an inclined push rod 46. The lower extremity of the push rod 46 is pivotally mounted between the sides of a U-shaped slide block 47 on a hinge pin 48. The slide block 47 is free to slide forward and back on the track slide bar 22 between the two cover plates 10 and 11 and is constantly urged rearwardly on the track slide bar by means of a tension spring 49. The spring 49 is connected at its forward extremity to a spring pin 50, extending between the two sides of the slide block 47, and at its rear extremity to the rear dowel pin 17. It can be seen that when the slide block is drawn rearwardly by the action of the spring 49 the push rod 46 will exert a toggle action on the hand lever to force the rear extremity of the latter upwardly and the forward extremity downwardly.

OPERATION

Let us assume that the shot reservoir 24 contains conventional, non-split, soft lead shot 28 and that one of the shot has rolled through the feed opening 27 into the shot socket of 36 of the forward extremity 34 of the anvil block 31 and that the knife blade 37 has descended into the latter shot to form a split in the top thereof, as shown in FIG. 3. The tool is now ready for use whenever it is desired to place the split shot on a fishing line.

To place the shot on the line, the tool is held in the palm of the hand and the hand lever is compressed toward the housing until the position shown in FIG. 9 is reached. In moving to this position, the forward extremity of the hand lever has raised to bring the fulcrum boss into contact with the top flanges 12 and in rising it has elevated the head block 39 to withdraw the knife blade 37 from the shot and from the anvil block. The slide block 47 has also been forced forwardly on the track slide bar 22 into contact with the rear of the plunger 50 as shown in FIG. 9.

The hand lever is now further compressed, the forward extremity thereof pivoting about the contact between the fulcrum boss 44 and the top flanges 12 so that the pivot slot 43 will ride downwardly on the pivot pin 41, to cause the push rod 46 to push the slide block 47 forward against the plunger screw 54. The forward movement of the plunger screw 54 causes the plunger spring 51 to force the anvil block 31 forwardly so as to project the shot-receiving extremity 34 thereof, with its contained split shot, forwardly from the housing as shown in FIG. 10. The plunger spring 51 is sufficiently stronger than the internal return spring 32 so that former spring will compress the latter spring as the anvil block is forced forwardly.

The fishing line is now laid in the knife blade slot 52 so as to lie in the split of the shot and the hand lever is further compressed to the broken line position of FIG. 10. In moving to the latter position the slide block 47 will be forced still further forward so as to force the plunger 50 against the split shot to close the split therein against the fishing line.

The hand lever is now released sufficiently to allow the shot socket 36 to align with the feed opening 27 so that another shot can roll from the reservoir into the socket 37. The hand lever is now completely released to the position of FIG. 3 to allow the knife blade 37 to be forced downwardly under the bias of the spring 49 to split and retain the next successive shot in place in the socket for the next use as shown in FIG. 3.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. A split shot tool comprising: a housing; a shot reservoir mounted on said housing and communicating with a feed opening in said housing; an anvil block slidably mounted in said housing; an extremity formed on said anvil block positioned to be projected through an opening in the end of said housing; a shot-receiving socket having a transversely-extending line receiving slot formed in said extremity and positioned to register with said feed opening to receive a shot therefrom when said extremity is retracted into said housing; means for manually forcing said anvil block forwardly to project said extremity and its contained shot forwardly of said housing to receive said line; abutment means limiting the forward movement of said anvil block; a plunger slidably mounted in said anvil block and positioned to enter said cavity to compress a split shot contained within said socket closed upon said line; and means for forcing said plunger forwardly against the contained shot for closing the split thereof on said line subsequent to the forward movement of said anvil block.

2. A split shot tool as described in claim 1 in which said anvil block is mounted to move forwardly in consequence of the actuation of the means for forcing said plunger forwardly.

3. A split shot tool comprising: a housing; a shot reservoir mounted on said housing and communicating with a feed opening in said housing; an anvil block slidably mounted in said housing; an extremity formed on said anvil block positioned to be projected through an opening in the end of said housing; a shot-receiving socket having a transversely-extending line receiving slot formed in said extremity and positioned to register with said feed opening to receive a shot therefrom when said extremity is retracted into said housing; a vertically reciprocable knife blade in said housing positioned over said line receiving slot when said socket is in register with said feed opening; means for urging said knife blade downwardly into said socket to split a shot contained therein and means for forcing said anvil block forwardly to project the latter split shot from said housing.

4. A split shot tool as described in claim 3 having a split closing plunger mounted in said anvil block and means for forcing said plunger against said latter split shot when the latter is in the forwardly projected position to close said split on a line.

5. A split shot tool as described in claim 4 having an operating handle projecting from and arranged to be swung toward said housing; means for causing the initial movement of said handle toward said housing to withdraw said knife blade from said contained shot; means for causing the next successive movement of said handle to urge said extremity forward to project the split shot from the housing; and means for causing the final movement of said handle to project said plunger to close the split in said contained shot.

6. A split shot tool as described in claim 5 in which the means for forcing said knife blade downwardly is actuated by the return of said handle to its original position.

7. A split shot tool comprising a first flanged cover plate; a second flanged cover plate; means securing said cover plates together with their flanges in contact to form a flat hollow housing closed at its bottom and at its front; a spacer block mounted in said housing adjacent the front and parallel to and spaced from said bottom; an elongated slide track affixed to said bottom; a shot reservoir mounted exteriorly against one cover plate adjacent the front thereof; a feed opening communicating from said reservoir through said latter cover plate below said spacer block; a reciprocating anvil block positioned below said spacer block; a shot holding forward extremity on said anvil block; a shot socket formed in the side of said extremity; spring means urging said anvil block rearwardly to register said socket with said opening to receive a shot therefrom; a first stop means for limiting the forward movement of said anvil block; a second stop means for limiting the rearward movement thereof; and manual means arranged to urge said anvil block forwardly to project said extremity through an opening in the front of said housing.

8. A split shot tool as described in claim 7 having a split-closing plunger slidably mounted in said anvil block and positioned when moved forwardly to enter said socket to compress a shot contained therein; spring means acting against said anvil block to urge said plunger rearwardly; a plunger stem mounted in said plunger and projecting rearwardly from said anvil block; said manual means being arranged to contact said plunger stem and act through said spring to move said anvil block resiliently forward against said first stop means and thence to continue to move said plunger forward in the stationary anvil block to compress the shot in said socket.

9. A split shot tool as described in claim 8 having a splitting knife blade mounted for vertical movement in said spacer block and adapted to enter the top of said socket when said anvil block is in the withdrawn position to split a shot contained therein and means for vertically reciprocating said knife blade in synchronism with the forward and back movements of said anvil block.

10. A split shot tool as described in claim 9 in which the means for vertically reciprocating the knife blade comprises: a hand lever; a shifting pivot, said hand lever being shiftably pivoted in said housing on said shifting pivot and projecting in plier-like relation to the housing; means connecting the hand lever forwardly of said pivot with said knife blade for vertically reciprocating the latter.

11. A split shot tool as described in claim 10 in which the manual means for urging the anvil block forwardly comprises: a slide block slidably mounted on said slide track and an inclined push rod extending from said hand lever to said slide block to exert a toggle-like action on the latter as said hand lever moves downwardly to force said slide block into contact with said plunger stem to force said anvil block forwardly.

References Cited in the file of this patent

UNITED STATES PATENTS

| 2,806,229 | Pletz | Sept. 17, 1957 |
| 2,844,059 | Lee | July 22, 1958 |
| 2,853,722 | Puzine | Sept. 30, 1958 |
| 2,941,431 | Christensen et al. | June 21, 1960 |

FOREIGN PATENTS

| 351,929 | France | May 16, 1905 |